US008888054B1

(12) United States Patent
Peterson et al.

(10) Patent No.: US 8,888,054 B1
(45) Date of Patent: Nov. 18, 2014

(54) SECURED BAG FORMING AND SUPPORT APPARATUS

(76) Inventors: Per Anders Peterson, St. Louis Park, MN (US); Brett Allen Shogren, Washington, DC (US)

( * ) Notice: Subject to any disclaimer, the term of this patent is extended or adjusted under 35 U.S.C. 154(b) by 128 days.

(21) Appl. No.: 13/065,927

(22) Filed: Apr. 1, 2011

Related U.S. Application Data

(60) Provisional application No. 61/341,879, filed on Apr. 6, 2010.

(51) Int. Cl.
*A63B 55/04* (2006.01)
*B65B 67/04* (2006.01)

(52) U.S. Cl.
USPC ............. 248/97; 248/99; 248/907; 280/654

(58) Field of Classification Search
USPC ............ 248/95, 97, 98, 99, 101, 129, 907; 280/47.18, 47.24, 47.26, 47.28, 641, 280/654, 651; 53/459, 469, 576, 483; 220/264, 845, 908, 500; 55/337, 356, 55/428, 429
See application file for complete search history.

(56) References Cited

U.S. PATENT DOCUMENTS

| | | | |
|---|---|---|---|
| 2,582,906 A | | 1/1952 | Heldenbrand |
| 3,563,505 A | | 2/1971 | Langley |
| 3,754,771 A | * | 8/1973 | Shagoury .................. 280/654 |
| 4,124,185 A | * | 11/1978 | Preisinger .................. 248/98 |
| 4,452,468 A | * | 6/1984 | Eads et al. ................. 280/47.28 |
| 4,846,427 A | * | 7/1989 | Jones ......................... 248/95 |
| 5,016,844 A | | 5/1991 | Garvin |
| 5,062,871 A | * | 11/1991 | Lemon, III ................ 248/98 |
| 5,209,517 A | * | 5/1993 | Shagoury .................. 280/654 |
| 5,271,589 A | | 12/1993 | Belous |
| 5,393,022 A | | 2/1995 | Palumbo |
| 5,456,431 A | * | 10/1995 | Ilnisky ...................... 248/98 |
| 6,293,505 B1 | | 9/2001 | Fan |
| 6,511,110 B2 | | 1/2003 | Roye |
| 7,546,989 B1 | | 6/2009 | Lineberry et al. |
| 7,669,728 B2 | | 3/2010 | Licata |
| 7,686,260 B1 | | 3/2010 | Tetradis |
| 7,922,024 B2 | * | 4/2011 | Yang et al. ................. 220/264 |
| 8,297,470 B2 | * | 10/2012 | Yang et al. ................. 220/845 |
| 2005/0044819 A1 | * | 3/2005 | Chomik et al. ............. 53/459 |

OTHER PUBLICATIONS

"JANIBELL"® www.janibell.com—self relining waste disposal system.
"AMES"® www.ames.com—leaf bag cart.

* cited by examiner

*Primary Examiner* — Tan Le

(57) ABSTRACT

The invention includes apparatus to assist a user in cleaning up trash, particularly lawn and garden materials. In one embodiment the device includes a waste receptacle having a supply of endless bagging material mounted at the rim portion thereof and a large side wall opening in the receptacle to permit the removal of the loaded bag. In another embodiment the device includes a platform having a central opening supported above the ground on legs or a frame member. Attached to the platform is an area holding a supply of endless bagging material which is fed through the central opening in the platform and tied off to form a bag. The platform and bagging material supply may be embodied in a tray with collapsible legs; optionally in a single use disposable format. In another embodiment the bagging assembly is mounted on a pole or a wheeled cart including a lower support member.

10 Claims, 12 Drawing Sheets

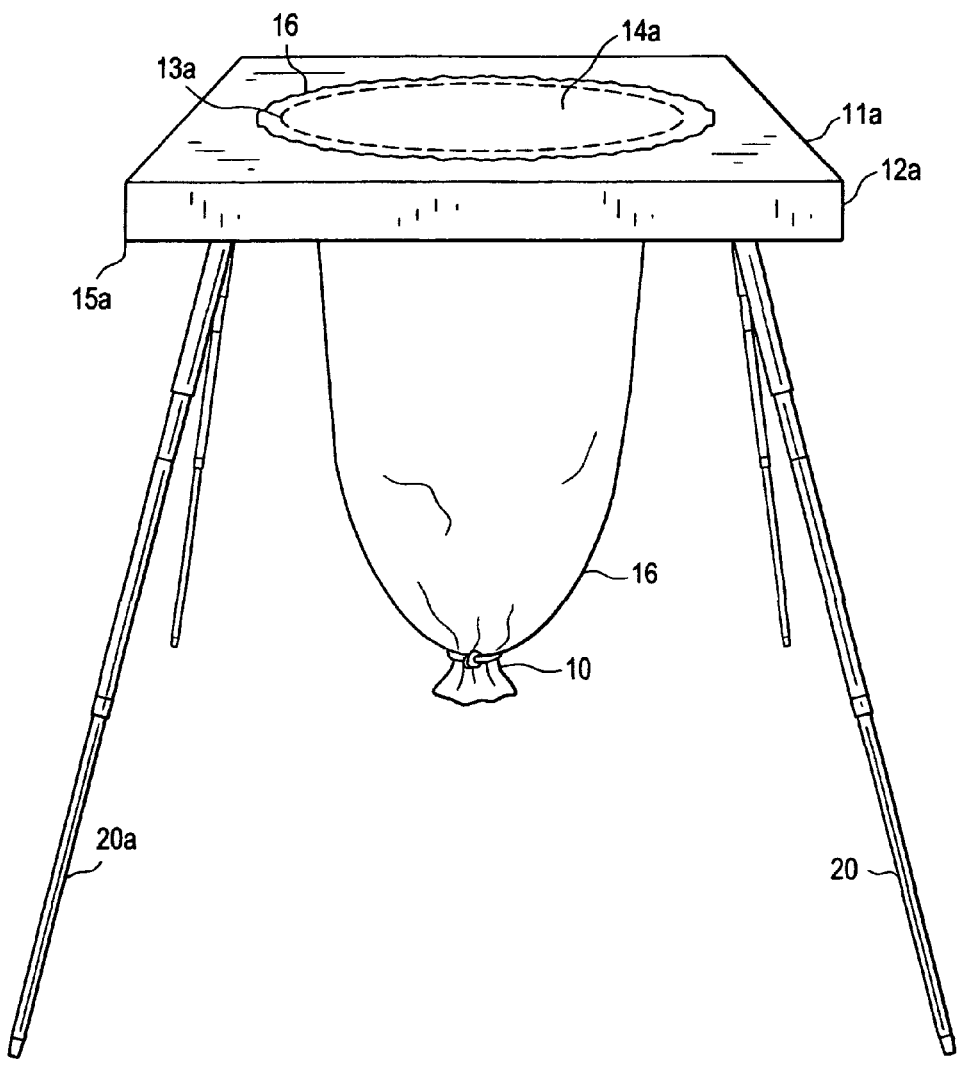

and SUPPORT APPARATUS

SECURED BAG FORMING AND SUPPORT APPARATUS

BACKGROUND OF THE INVENTION

Whenever one sets out to undertake a cleanup process, whether inside the house or outside in the yard, that effort almost always includes having to "bag up" the waste and trash materials for removal and disposal. This effort also includes the constant effort to keep the bag open as the materials are stuffed into it. One of the most common attempts to deal with this process involves placing a rather large, usually about 30-gallon, trash bag into a regular trash can to support the bag and aid in the effort. This process is most familiar to those who work outside in the yard, whether cleaning up a garden or flower bed or the annual ritual of raking up the leaves in the fall.

Unfortunately, that process of using the trash can to support the bag usually leads to one or both of two undesirable results. Sometimes, the bag is under-filled resulting in a waste of a very large number of bags; especially when working to rake up the leaves or other waste from a large yard area. This frequently results in the discovery of having too few bags and the necessity of another trip to the store during the work effort. Other times the bag is loaded so heavily with leaves or other waste, the result from constant attempts to compact the volume and get as much waste as possible into the bag, that when the bag is attempted to be removed from the trash can, either the vacuum between the bag and trash can or the shear weight of the waste leads to the bag tearing near its open end or along its bottom seam. This latter result means having to reload the leaves or other waste into a second bag and leads to the almost sure frustration of the user.

There have been many attempts to overcome these deficiencies in the waste and trash bagging process. U.S. Pat. No. 7,686,260 to Tetradis shows a cart mounted lawn and leaf bagging assembly. U.S. Pat. No. 7,669,728 to Licata shows a trash bag dispensing unit. U.S. Pat. No. 7,546,989 to Lineberry et al discloses a leaf bagging apparatus which serves to hold the receiving bag in an open condition and which is collapsible for easy storage. U.S. Pat. No. 6,511,110 to Roye shows a refuse collecting tool having a collapsible frame that clamps the refuse bag to its top portion for easy loading. U.S. Pat. No. 6,293,505 to Fan teaches another collapsible open frame assembly that includes a platform portion to which a refuse bag may be clamped to hold the same in an open condition. U.S. Pat. No. 5,393,022 to Palumbo discloses a leaf bagging assembly for holding a trash bag in an open condition. U.S. Pat. No. 5,271,589 to Belous shows a collapsible trash bag holding apparatus made from corrugated paper having a waxed surface and a funnel portion to help to direct waste into a trash bag supported on the assembly. U.S. Pat. No. 5,016,844 to Garvin shows a leg frame assembly for supporting a trash bag. U.S. Pat. No. 3,563,505 to Langley discloses a trash bag supporting frame that includes a reservoir to hold a supply of the trash bags. U.S. Pat. No. 2,582,906 to Heldenbrand shows a pole-mounted trash assembly. JANI-BELL shows a self-relining waste disposal system employing a supply of endless bagging material. AMES shows a seasonal yard cart for leaf and garden waste collection.

Notwithstanding these efforts, many of the prior art problems still remain unsolved. When a trash bag is clamped into place and then filled, extreme stress occurs at and adjacent to the area where it is clamped. Given that the trash bags tend to be made with relatively thin walls, for reasons of economy, filling the bags may still result in tearing of the trash bag. Also, the bags used with these devices are pre-made, one size-fits-all bags that may be far too large for some jobs and too small for others. This fixed size results in the unused bag volume and stuffing and compacting problems noted above. Further, when a bag in use becomes full, the user must unclamp the current bag in use and mount another bag on the frame; resulting in much lost time and effort, especially when raking and bagging the leaves from a large yard area.

It would be highly desirable to have a trash or yard waste bagging assembly wherein each bag may be sized for the job at hand, small when necessary and larger as required. The assembly should be convenient to use for one person working alone, retain the bag in an upright and open condition, and have a means to facilitate the loading of the bag, particularly with leaves and garden waste materials. Additionally, it would be very useful to have a supply of bagging material to provide for a substantial number of bags, bagging material thickness that could be varied depending upon the weight and volume of the waste to be handled and means such that a loaded bag could be easily tied off for closure. Further, the ability to move the bagging assembly about the work site would be highly desirable.

SUMMARY OF THE INVENTION

It is an object of this invention to provide a supply of endless bagging material that can be employed to form bags of various sizes and thicknesses as needed to clean up waste and trash materials.

It is another object of this invention to provide a bag support assembly that supports a bag in an open and upright condition and from which a fully loaded bag may be easily removed without concern over the bag being torn.

It is yet another object of this invention to provide a bag support assembly wherein the bag may be held in an open condition with at least a portion thereof in close proximity to the ground surface such that debris can be pushed or directed into the bag without the need to pick-up the waste materials.

It is a further object of this invention to provide a bag with a very strong bottom seal, a seal formed by an area of gathered bagging material, instead of the traditional linear bottom seam.

It is still a further object of this invention to provide a bag support assembly that is collapsible to a smaller size for convenient storage.

It is a yet further object of this invention to provide a bag supporting assembly and supply of endless bag forming material that are simple in design and, optionally, appropriate for a single use and disposable.

It is another object of this invention to mount the bag supporting assembly on a cart including wheels to facilitate moving the assembly to various locations in the work area and to provide a support surface for the bag in filing the same.

It is yet further an object, of this invention to provide a bagging assembly that may be mounted on a ground supported pole or other vertical surface.

These and other objects of the present invention are provided in a trash or waste bagging assembly that includes a supply of endless bagging material that can easily be formed into a bag of the desired size for the job at hand. The supply of bagging material is retained in a holding area or tray wherein the tray may optionally be formed from cardboard material. Alternatively, the supply of endless bagging material may be provided in a cardboard cartridge. When formed, the bag is supported in an upright and open position for easy loading of the waste material; allowing a person to work alone without the assistance for another. The supporting frame for the bags is formed to allow easy closure and removal of a loaded bag without the concern of tearing the filled bag and spilling its contents.

In one embodiment of the invention, the supporting frame is comprised of a standard trash container, a trash can, formed with a large side opening to permit easy forming, closure and removal of the waste bag. The side opening may be closed off or opened using a sliding door mounted in a track way adjacent the side wall opening of the container. The bagging material is housed in a round receiving chamber formed at or attached to the rim of the waste container.

In another embodiment of the invention, the supporting frame is formed as a flat platform with several legs. The legs are collapsible, attached to the platform for movement from a storage position lying substantially flat against the underside of the platform to a use position wherein the legs extend from the underside of the platform to support the same above the ground surface. The platform has a centrally disposed opening adjacent to which is mounted the supply of endless bag material. That supply of bagging material is retained in a tray attached to the platform or in a cardboard cartridge which is removably secured to the platform. The spacing of the legs provides a large open area to facilitate forming, closing and removing the loaded waste or trash bag.

In yet a further embodiment of the invention, the platform and legs of the supporting frame are formed as a single tray member. Optionally this very simple assembly may be formed from a corrugated cardboard material, in whole or in-part, which makes the assembly ideal for a one time use and disposable item. The supply of endless bagging material is housed a container area that is formed in the tray or the tray itself may be formed from cardboard and serve as a cartridge of bagging material to which the legs may be directly attached. Again, the spacing of the legs provides a large open area to facilitate forming, closing and removing the loaded waste or trash bag.

In yet another embodiment of the invention, the cartridge of endless bagging material is mounted on a cart assembly including wheels to facilitate moving the assembly to various sites in the work area. The cart may also include a lower plate member to support the bag during filing and to further assist in moving the filled bag to a drop-off area. Rather than being mounted on wheels, the bagging assembly may be mounted on a ground supported pole for movement about the work site. In either of these arrangements, the surrounding area adjacent to the bag to be filled is substantially open such that a filled bag may be easily removed from the assembly.

In each of the above mentioned embodiments, the bags may be formed by knotting the bagging material or, alternatively, a bag tie member may be applied to the bagging material. These methods may be used to form the bottom closure of a newly formed bag or to close a fully loaded bag in use. The use of the knot or tie member forms an area of gathered bagging material that provides a very strong seal area when compared to the traditional linear seam of a pre-formed plastic bag. The supplies of endless bagging material may be provided in varying bag wall thicknesses to accommodate the specific requirements of the job to be performed or the type and weight of the waste to be handled.

BRIEF DESCRIPTION OF THE DRAWINGS

FIG. 4A is a perspective view of a third embodiment of the invention including a tray having collapsible leg members that receives a supply of the endless bagging material.

DESCRIPTION OF THE PREFERRED EMBODIMENTS

Figure 1A:
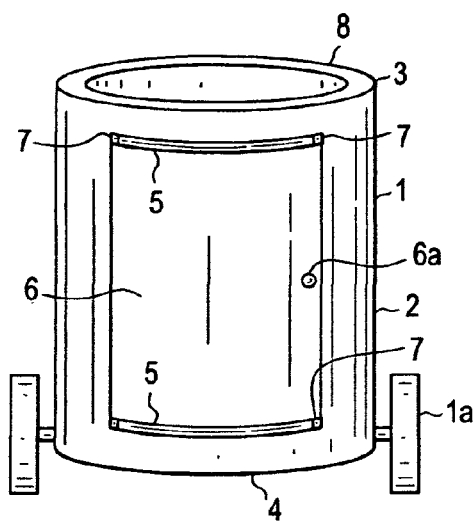
FIG. 1A is a perspective view of a first embodiment of the invention including a trash container support assembly with the side door in the closed position.
Figure 1B:
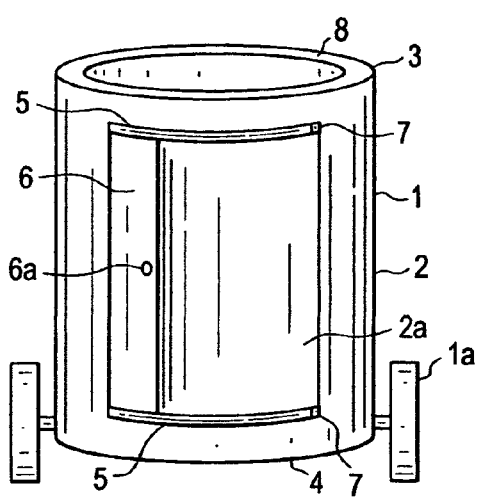
FIG. 1B is a perspective view of the trash container support assembly with the side door in the open position.
Figure 1C:
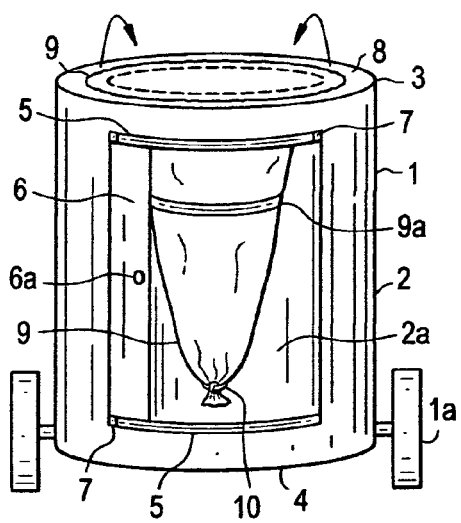
FIG. 1C is a perspective view of the trash container support assembly with the side door in the open position and a bag formed for use and positioned within the trash container.

A first embodiment of the invention is shown in FIGS. 1A to 1C employing a standard trash receptacle or can 1. The receptacle or can may be provided with wheels 1a to facilitate rolling the receptacle to and from the work site where it is to be used. Although the wheels are shown as mounted at the side of the receptacle, it should be understood that the receptacle could include "caster-type" wheels mounted at the bottom of the receptacle. The sidewall 2 of the receptacle has an opening 2a therein, extending from adjacent the top rim 3 of the receptacle to adjacent the bottom wall 4 of the receptacle and along the circumferential sidewall 2 of the receptacle. The edges of the opening 2a are reinforced with slightly thickened area of material to provide extra support and rigidity for that opening. At the top and bottom edges of the opening 2a there is mounted a track way 5 that is secured to the inside of the receptacle 1 by gluing, riveting, or other appropriate methods. Further, the track ways could be integrally formed on the side wall of the receptacle if so desired, such as by molding or other appropriate means. The track way 5 is u-shaped and the opening of the u-shaped track way faces away from the top rim 3 or bottom wall 4 of the receptacle adjacent to which it is secured. It should be readily understood that the track ways 5 could alternatively be secured to the outside of the side wall 2 of the receptacle. Mounted in the track ways 5 is a door member 6 which is of slightly larger size than the opening 2a and serves to open and close the opening 2a by sliding in the track ways 5. The door may have handle region or member 6a to facilitate sliding the door member between its closed position shown in FIG. 1A and its open position shown in FIG. 1B. To facilitate the easy removal of a loaded bag, the opening 2a should be sufficiently large in the circumferential direction of the receptacle sidewall and could extend up to a full 180 degrees thereby making a full one half of the receptacle sidewall 2 open. At each end of the track ways 5, both at the top and bottom portions thereof, there is formed a stop member 7 which prevents the door from sliding off or out of the track ways in which it is secured. As an option, the receptacle may be formed in two pieces with the bottom wall mounted on a flat carriage assembly with wheels such that very heavy bags, as in construction and industrial uses, do not need to be pulled out from the receptacle but rather may be slid out of the receptacle on the carriage.

At the top rim 3 of the receptacle there is positioned a circular canister 8 that holds a supply of endless bag forming material 9. The canister has a closed bottom wall and inner and outer side walls defining the endless bag material holding area and a central opening through which the endless bag material is fed downwardly into the receptacle. The term a supply of endless bag material describes a continuous tube of plastic material that is folded upon itself thereby allowing the supply to be unrolled as bags are formed during the use of the device, as described below. The canister 8 may be designed to sit on the top of the receptacle rim 3 and held in place by any appropriate means such as by a collar that fits inside and closely adjacent to the receptacle sidewall, by a u-shaped member on the bottom wall of the canister that fits over the top rim 3 of the receptacle or by gluing, riveting, molding or any other appropriate means. On the supply of endless bagging material there is a boldly colored warning strip 9a that indicates that the supply is almost at the end of the continuous tube of material. When necessary, a new supply of endless bagging material is placed directly into the canister. The bagging material can be supplied in various thicknesses depending upon the intended job application; light weight for household uses, moderate weight for yard jobs and heavy weight for industrial and construction uses. Further, there can be an option for biodegradable bagging material if desired. Still further, a smaller embodiment of the trash receptacle could be provided for in-house waste disposal; i.e. a kitchen waste receptacle employing the bag forming and side wall removal concepts of this embodiment.

In use, to start a first bag, the bagging supply material is pulled from the supply canister and a first bag forming member 10 is applied adjacent to the open end of the bagging material. This first bag forming member 10 may be a knot tied by the user, a cable tie pulled tightly to bunch or gather the material, or any other convenient clip member that will securely hold the bag material in the desired bunched or gathered condition forming a very strong seal area. The gathered bagging material and bag forming member 10 are then pushed downwardly into the receptacle 1 such that the bag forming member 10 is located inside the depending tube of bagging material thereby forming the first bag for use. Alternatively, the bagging material may be pulled down into the container and then the bag forming member may be applied to the open end of the bagging material; thus leaving the knot or tie member outside the formed bag. Trash and other waste material may then be loaded into the bag as desired. When the first bag is substantially full, a second cable tie or other bag clip member 10 applied to the loaded bag just above the fill level of the debris or waste in the bag and another cable tie or bag clip member 10 is applied to the supply of bagging material approximately one or two inches above the second cable tie or bag clip member used to close off the top of the first formed bag. The user then cuts the supply of bagging material between the two spaced cable tie or bag clip members 10 and the first filled bag is ready for removal from the receptacle through the sidewall opening 2a. The bottom of the second formed bag is now closed by the upper one of the two cable ties or bag clip members applied to the supply of bagging material and that second cable tie or bag forming clip is located outside of the bottom portion of the second formed bag. This resulting newly formed bag is shown in FIG. 1C with the prior fully loaded bag having been removed and the new bag pulled into its use position in the receptacle. This process may be repeated to form additional bags until the indicator strip 9a on the bagging material shows the need to replace the supply of bagging material. As necessary, a new supply of endless bagging material is placed into the canister for use.

This embodiment of the invention eliminates the necessity of having to lift a heavy, fully loaded bag up to remove the same from the can; thereby eliminating the possibility of a potential back strain for the user and tearing the bag and spilling the waste products. Further, with the door in the closed position, the device may be used as a conventional trash receptacle and may be provided with a lid for this purpose.

In a second embodiment of the instant invention the apparatus comprises a flat platform combined with a tray holding a supply of endless bagging material. Although the platform may be supported on a frame have a sidewall opening similar to the opening described above in the first embodiment, it is preferred that the platform is supported by a set of collapsible leg members. The tray holding the supply of the endless bagging material is secured to the top of the platform when the device is ready for use. This arrangement allows the device to be placed in a collapsed condition for easy storage.

Figure 2A:
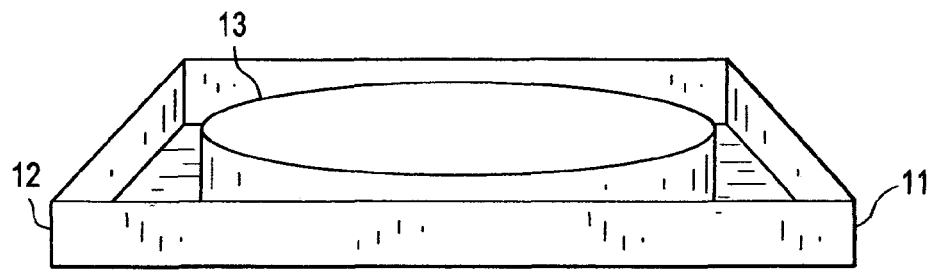
FIG. 2A is a side elevation view of a supply tray for holding a supply of endless bagging material for a second embodiment of the invention.
Figure 2B:
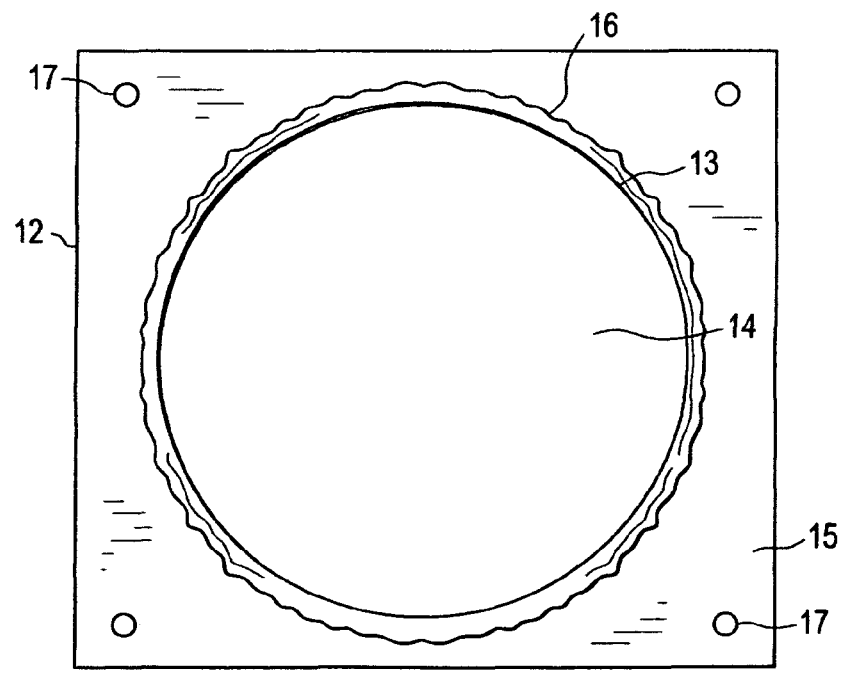
FIG. 2B is a top view of the supply tray of the second embodiment of the invention.

As shown in FIG. 2A the tray 11 includes an open top container having upstanding side walls 12 and a circular center wall 13 that forms a circular opening 14 in the tray bottom wall 15 through which the endless bagging material 16 held between the sidewalls 12 and the circular wall 13 is fed to the bag forming and filling positions, described below. The outer upstanding side walls 12 may have either a continuous wall or a number of wall portions, even finger-like sections, that extend therefrom parallel to the bottom wall 15 and towards the inner center wall 13 to define a top wall for the tray. Between that top wall and the inner center wall 13 there is an opening from which a supply of endless bagging material held in the tray is fed to form the bags for use and through which a supply of the endless bagging material is loaded into the tray. The supply of bagging material includes an end-of supply indicator strip as discussed above in the first embodiment. As shown in FIG. 2B the bottom wall 15 of the tray includes holes 17 for securing the tray to the platform, described below, by means of bolts, screws or other appropriate means. Alternatively, the tray may be secured to the platform by gluing or other appropriate means.

Figure 3A:
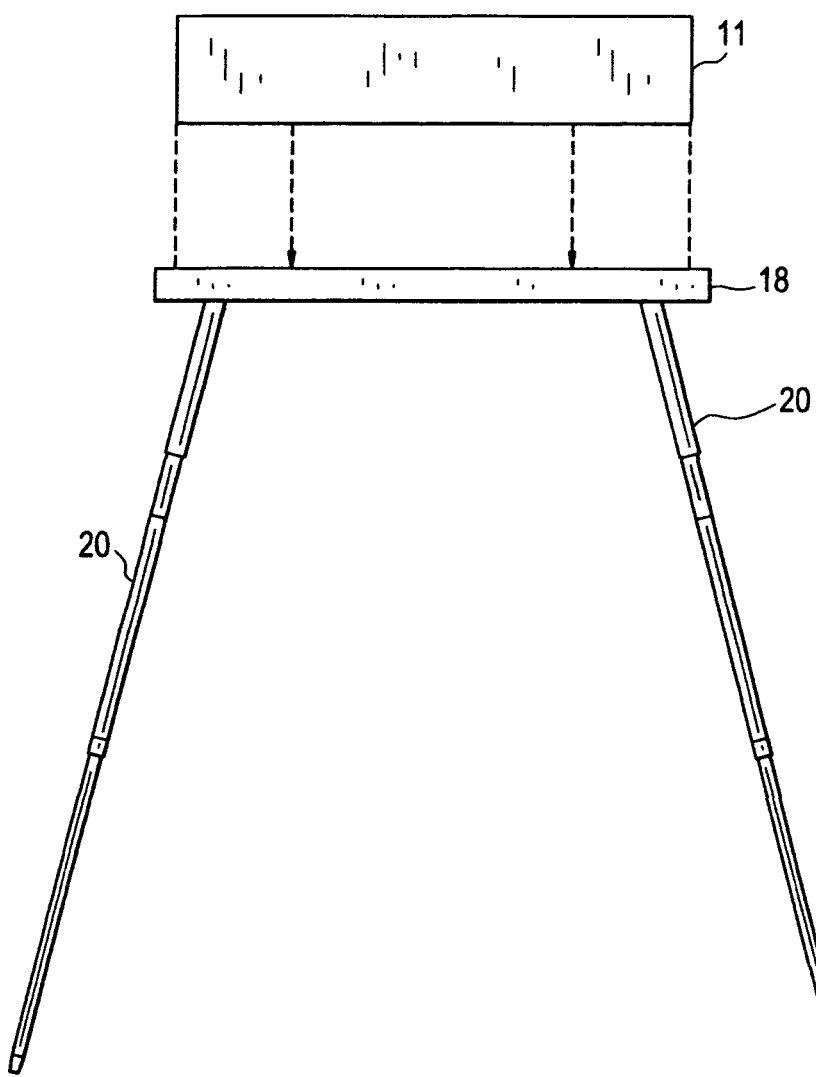
FIG. 3A is an exploded side view of the second embodiment of the invention including a platform with collapsible legs and a supply tray of endless bag material positioned above the platform.
Figure 3B:
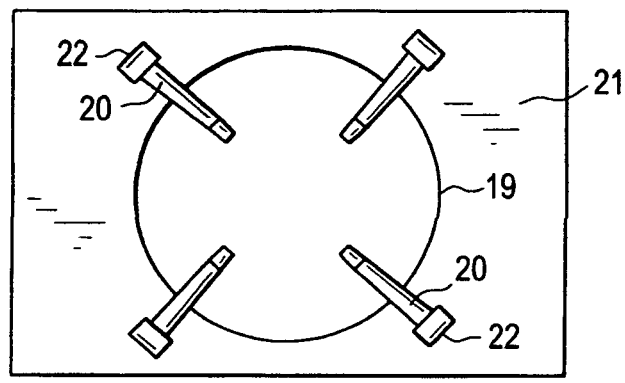
FIG. 3B is a bottom view of the platform of the second embodiment of the invention with the legs in the folded position for storage.

As shown in FIG. 3A the second embodiment of the invention includes a platform 18 having a central opening 19 that is aligned with the circular opening 14 of the tray 11 when the tray is secured to the platform for use. The platform also includes leg members 20 to support the device above ground or working surface. As shown in FIG. 3B the leg members 20 are attached to the bottom 21 of the platform by hinge members 22 that allow the legs to move from an extended position for use to a collapsed position adjacent the bottom of the platform for storage. Although the platform 18 is shown as substantially square or rectangular, it should be readily apparent that many other shapes for the platform could be employed and the number of leg members 20 would then be adjusted to ensure a stable working condition for the device. Further, the leg members 20 could be attached to the bottom of the platform by a set of sockets or receiving recesses and simply removed from the sockets or recesses for storage of the device. Further, the platform may be shaped such that the open bag may be held in close proximity to the ground surface by laying the assembly on its side such that debris and waste materials may be pushed or directed into the bag with a broom, rake or other appropriate implement.

Figure 3C:
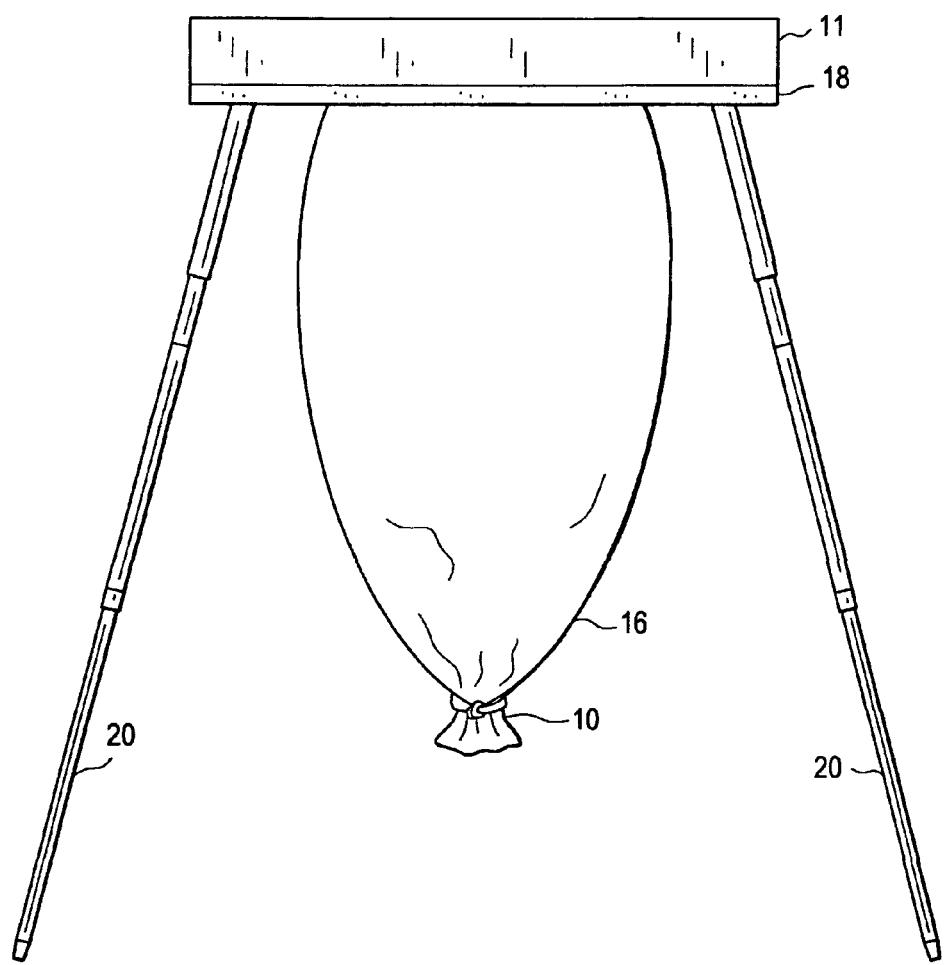
FIG. 3C is a side view of the platform with the legs in the extended position, a tray of endless bag material positioned on the platform and a formed bag extending from the platform for use.

To form the first bag when using the device of the second embodiment, a user follows the same process as described above for the first embodiment of the invention. Each second and subsequent bag is also formed by following the same process noted above for the first embodiment of the invention. FIG. 3C shows a second or subsequent bag extending from the platform and ready for filling with trash or waste materials.

Figure 3D:
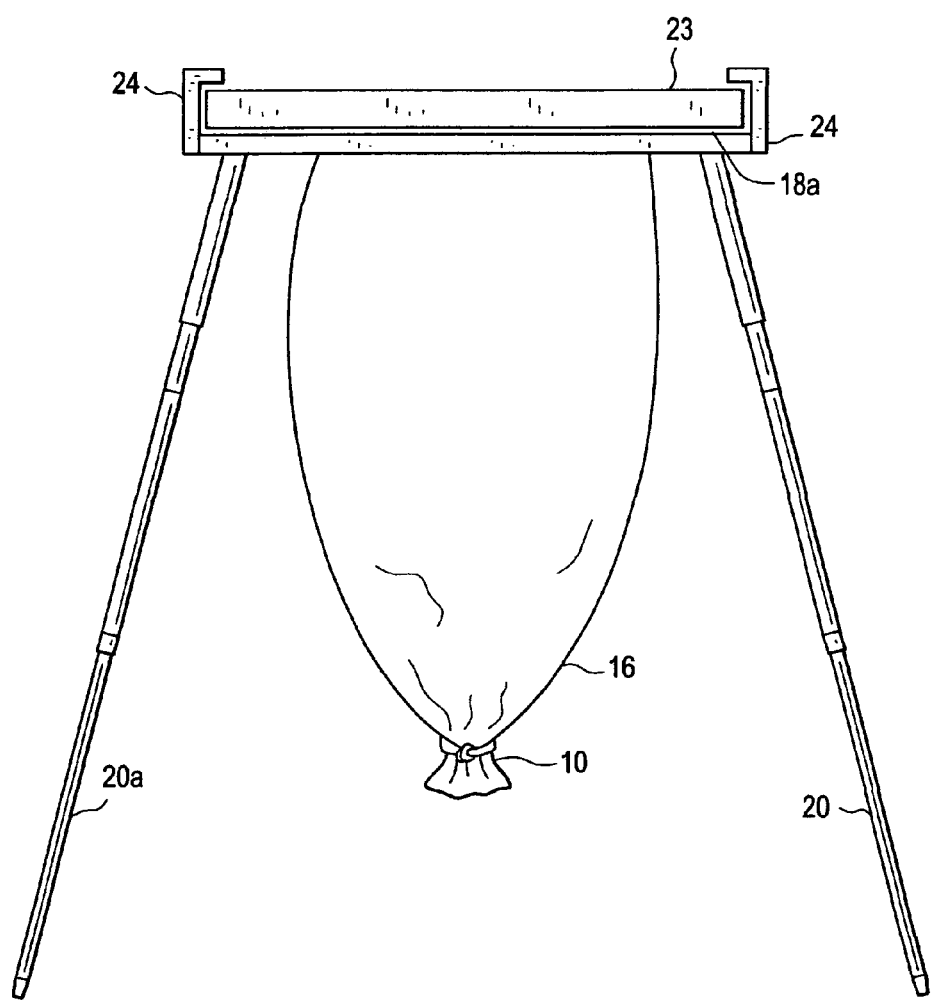
FIG. 3D is a side elevation view of the second embodiment of the invention employing a cardboard supply cartridge of endless bagging material instead of the supply tray.

In the second embodiment of the invention it is also possible to replace the tray with a supply of endless bagging material in the form of a cardboard cartridge of bagging material 23 that is secured to the platform. As shown in FIG. 3D, the cartridge of the endless bagging material 23 is mounted directly to the platform top surface 18a by a bracket 24. The cartridge has an inner circumferential upstanding wall and an outer circumferential upstanding wall between which the supply of endless bagging material is held. The cartridge also includes a top and bottom wall extending between the side walls to form an enclosure for holding the supply of endless bagging material. The inner upstanding side wall of the cartridge defines an opening through the cartridge between the top and bottom walls thereof. The cartridge further includes an opening in the inner side wall to dispense the endless bagging material for use. However, the cartridge is mounted such that the endless bagging material is fed downwardly from the cartridge towards the ground or other working surface. The supply cartridge could also be mounted to the platform by clips on the platform or any other appropriate means. When the supply cartridge is nearly empty, as shown by the indicator strip discussed above, the cartridge is removed from the bracket or clips and a new one is inserted in its place.

In the third and simplest embodiment of the invention the device includes a tray member to which a set of collapsible legs is attached and the tray has a receiving area to house a supply of the endless bagging material. Included within this embodiment is the design wherein the tray is replaced by a cardboard cartridge of endless bagging material such as the one disclosed in the second embodiment above and the legs are connected directly to the cartridge. In this optional design the legs may also be made from corrugated cardboard, preferably reinforced with a wax coating or plasticized outer surface. When employing the cardboard cartridge and connecting the legs directly to the cartridge, the device is intended to be of the single use type and disposable upon the completion of the clean-up effort at hand.

As shown in FIG. 4A the tray is of the same design as the tray in the second embodiment. The tray 11a includes an open top container having upstanding side walls 12a and a circular center wall 13a that forms a circular opening 14a in the tray bottom wall 15a. The outer upstanding side walls 12a may have either a continuous wall or a number of wall portions, even finger-like sections, that extend therefrom parallel to the bottom wall 15a and towards the inner center wall 13a to define a top wall for the tray. Between that top wall and the inner center wall 13a there is an opening from which a supply of endless bagging material held in the tray is fed to form the bags for use and through which a supply of the endless bagging material is loaded into the tray. The area between the sidewalls 12a and the circular center wall 13a is adapted to receive a supply of endless bagging material. The supply of bagging material includes an end-of supply indicator strip as discussed above in the first embodiment. The supply container is preferably made from a rigid material such as plastic or metal, although other appropriate materials could be employed. The tray has attached thereto by hinge members 22a a set of collapsible legs 20a that are adapted to move from a collapsed storage position to an extended use position in the same manner as the leg members of the second embodiment of the invention. Further, as in the second embodiment, with the leg members in the extended position, the endless bagging material is fed from the supply container through the circular opening 14a to the bag forming and filling positions, described below.

Figure 4B:
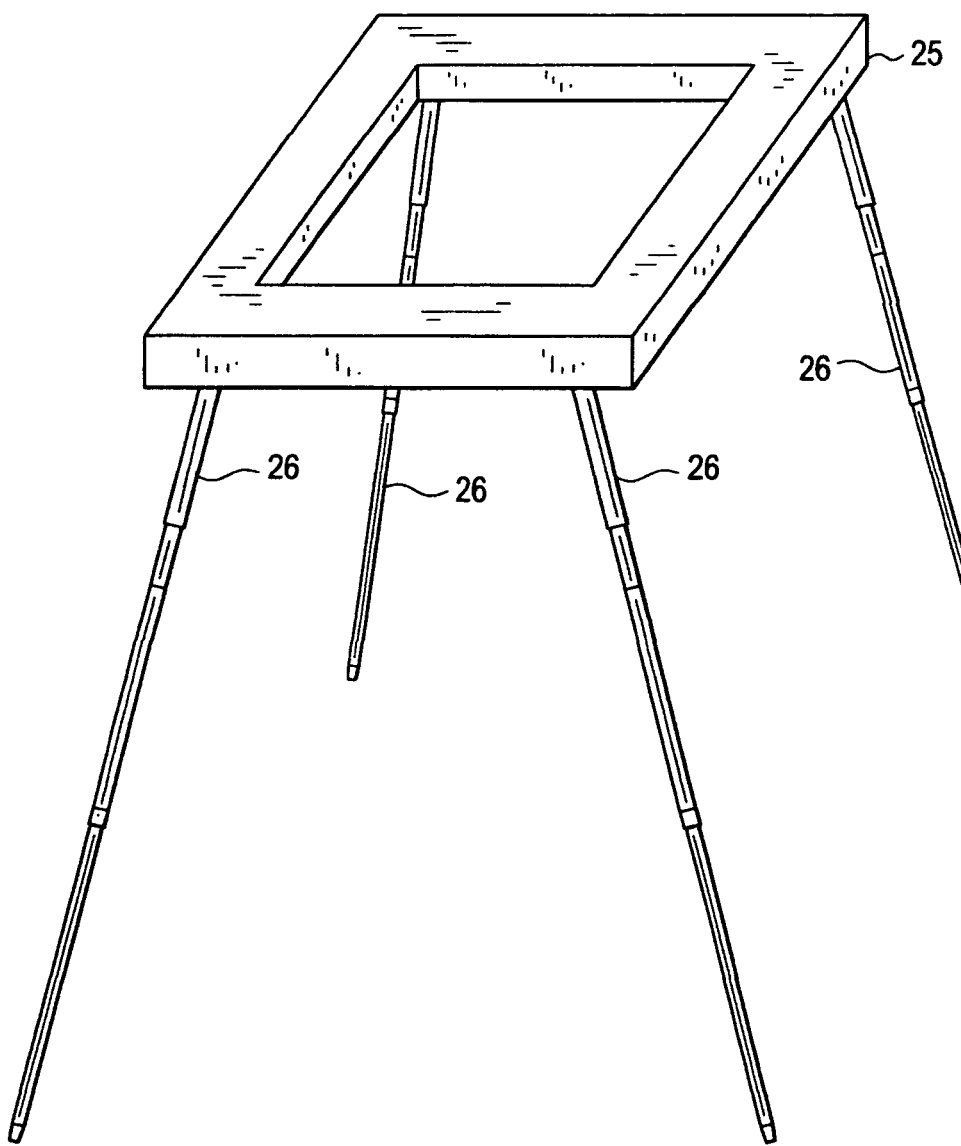
FIG. 4B is a perspective view of the third embodiment of the invention wherein a cardboard cartridge of the supply of endless bagging material has the legs connected directly to it.

FIG. 4B shows an optional design for the third embodiment of the invention wherein the tray is replaced by a cardboard supply cartridge 25 of the endless bagging material, as used in the second embodiment above. Again, the supply of the endless bagging material would include an end of supply indicator strip as in the embodiments described above. In one form of this option the legs 26 are not movably mounted as in the second embodiment of the invention or as in the tray of the third embodiment described in FIG. 4A above, but rather connected directly to the cardboard cartridge. Any appropriate means such as pre-perforated connecting areas on the cardboard supply container and barbed-ends on the leg members could be employed to connect the leg members to the cartridge. In another form of this option the legs may be formed from reinforced or coated cardboard and connected to the supply cartridge. This option is intended to be a one-time use arrangement and disposable upon completion of the task at hand; although the barbed-ended legs may be retained for use with another supply cartridge in a future effort. Again, in either option of this third embodiment, the tray or cartridge may be shaped such that the open bag may be held in close proximity to the ground surface by laying the assembly on its side or by not attaching the leg members such that debris and waste materials may be pushed or directed into the bag with a broom, rake or other appropriate implement.

To form the first bag when using the device of the third embodiment, a user follows the same process as described above for the first and second embodiments of the invention. Each second and subsequent bag is also formed by following the same process noted above for the first and second embodiments of the invention. FIG. 4A shows a second or subsequent bag extending from the tray or supply cartridge, respectively, and ready for filling with trash or waste materials.

Figure 5A:
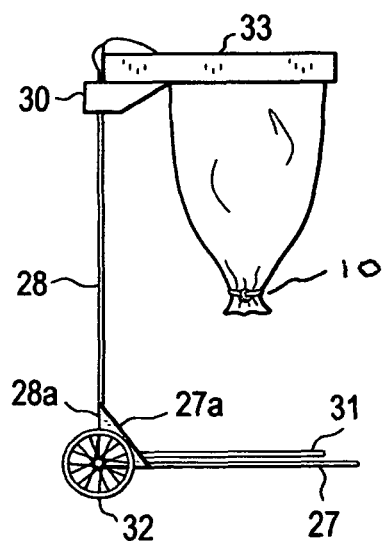
FIG. 5A is a side view of the fourth embodiment of the invention including a cart assembly and cartridge of endless bagging material with a formed bag depending from the cartridge.
Figure 5B:
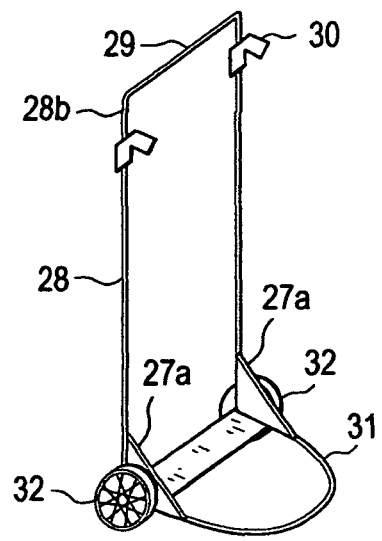
FIG. 5B is a perspective view of the cart assembly of the fourth embodiment of the invention.

In the fourth embodiment of the invention, the cartridge of endless bagging material is mounted on a wheeled cart assembly to facilitate moving the assembly about the work site. As shown in FIGS. 5A and 5B, the cart assembly includes a frame having a lower portion 27 extending parallel to the ground or other work surface, two upstanding members 28 extending at approximately 90 degrees from the lower portion 27 at 28a and an upper handle portion 29 extending between the members 28 at portion 28b thereof. Although two upstanding members are shown, there could be additional such upstanding frame members depending upon the size of the cart and the potential weight of the waste or trash to be handled. Further, the lower portion 27 could be pivotally mounted, such as by the folding hinge elements 27a, to the upstanding members 28 such that the cart assembly could be folded into a substantially flat condition for easy storage. On each of the upstanding members 28 adjacent the upper portions thereof there is mounted a cartridge support member 30 extending from the upstanding member in the same direction as the lower portion 27. The surface of the support members 30 that engages the top or bottom wall of the cartridge may include a friction enhancing material 30a, such as rubber or raised tooth portions, to increase the clamping action between the cartridge and the cart. The portion of each of the upstanding members 28 just above the cartridge support members 30 serves a cartridge support element or surface for the outer side wall of the cartridge that is pressed against that cartridge support element or surface. Attached to the lower portion 27 and extending substantially across the width and length thereof is a support member 31 that serves as a support surface for a formed bag during the filling process. Mounted on each of the upstanding support members 28 adjacent to the lower portions thereof at 28a is a wheel member 32.

Figure 5C:
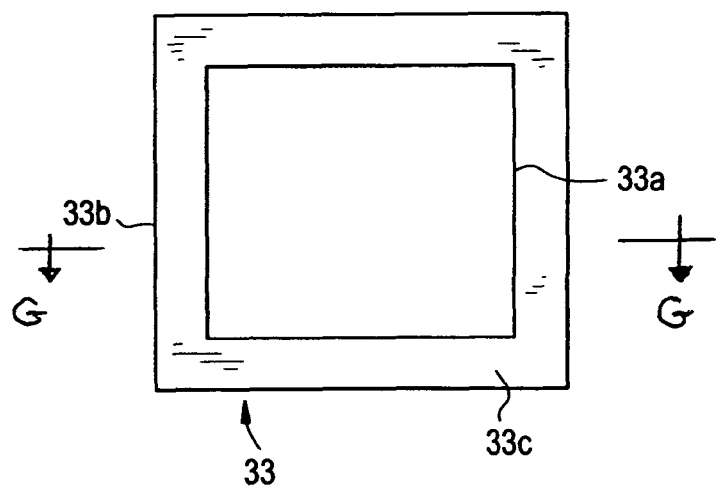
FIG. 5C is a top view of the cartridge of endless bagging material.
Figure 5D:
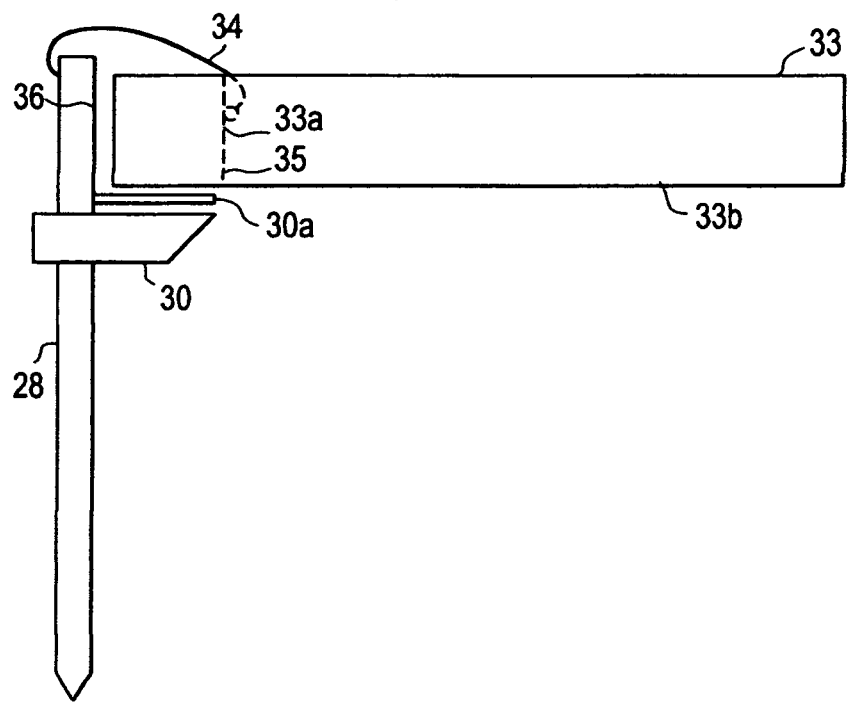
FIG. 5D is detailed side view of the cart frame mounting assembly for the cartridge of endless bagging material and a cartridge positioned on the cart mounting assembly.

As shown in FIG. 5C the cartridge of endless bagging material 33 is formed of cardboard as in the second and third embodiments disclosed above. The cartridge has an inner circumferential upstanding wall 33a and an outer circumferential upstanding wall 33b between which the supply of endless bagging material is held. The cartridge also includes a top and bottom wall extending between the side walls to form an enclosure for holding the supply of endless bagging material. The inner upstanding side wall of the cartridge defines an opening through the cartridge between the top and bottom walls thereof. The cartridge further includes an opening 35 in the inner side wall 33a to dispense the endless bagging material for use. However, the cartridge is mounted such that the endless bagging material is fed downwardly from the cartridge towards the ground or other working surface. As shown in FIG. 5D the cartridge is firmly secured to the cart assembly by placing the cartridge on each of the cartridge support members 30 with the outer circumferential upstanding wall 33b pressed against the cartridge support element or surface on each of the upstanding members 28 and mounting at least one clip member 34 that engages the inner annular wall 33a of the cartridge and the handle portion 29 between the ends thereof to clamp the cartridge to the cart. Additional clips may be employed for a stronger clamping action between the cartridge and the cart handle portion. Further, the clip could be designed to engage the top wall of the cartridge to clamp the cartridge to the cartridge support members. Again, the supply of the endless bagging material would include an end of supply indicator strip as in the embodiments described above.

Figure 5E:
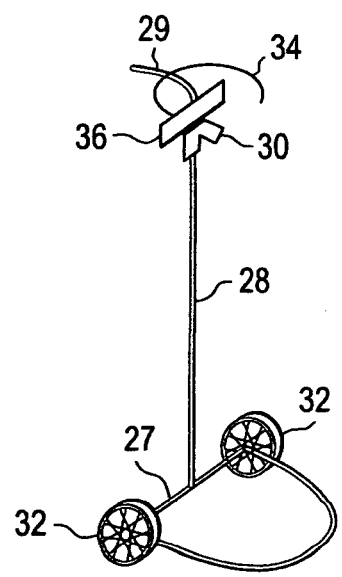
FIG. 5E is a perspective view of the cart embodiment including a single upstanding member and a cartridge support element.
Figure 5F:
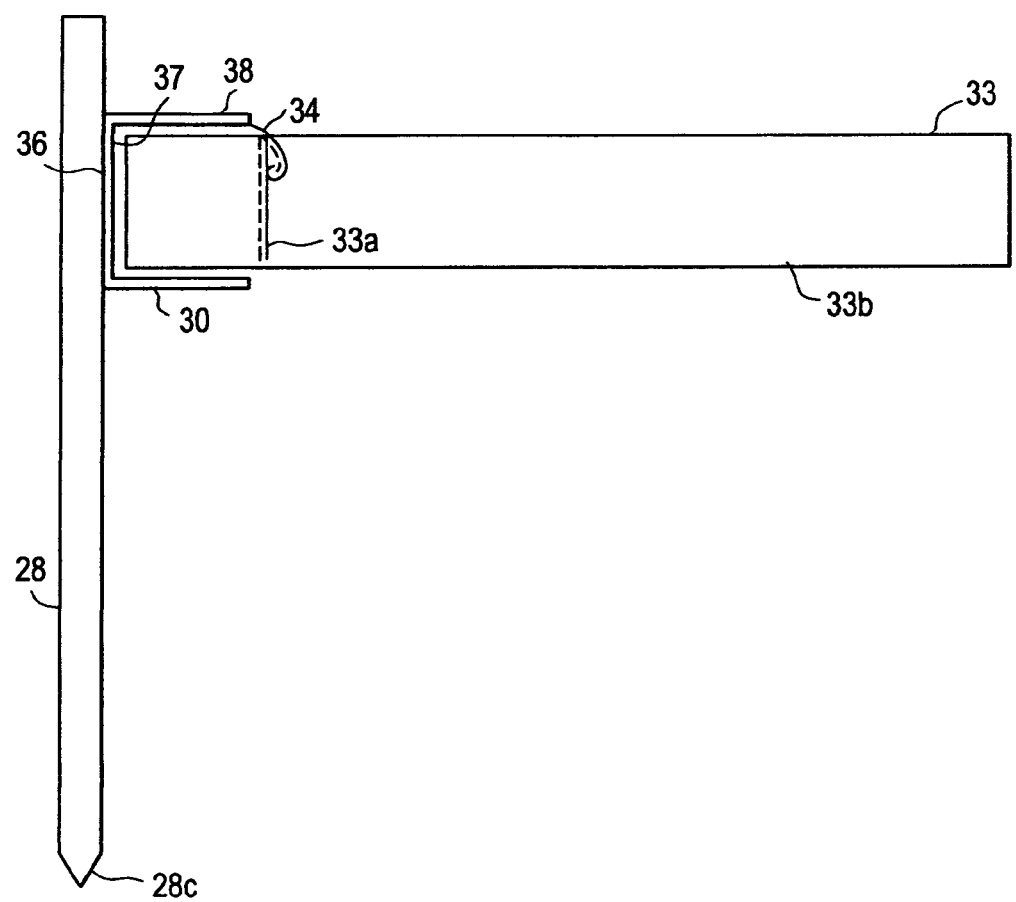
FIG. 5F is perspective view of the pole mounted embodiment of the invention.
Figure 5G:
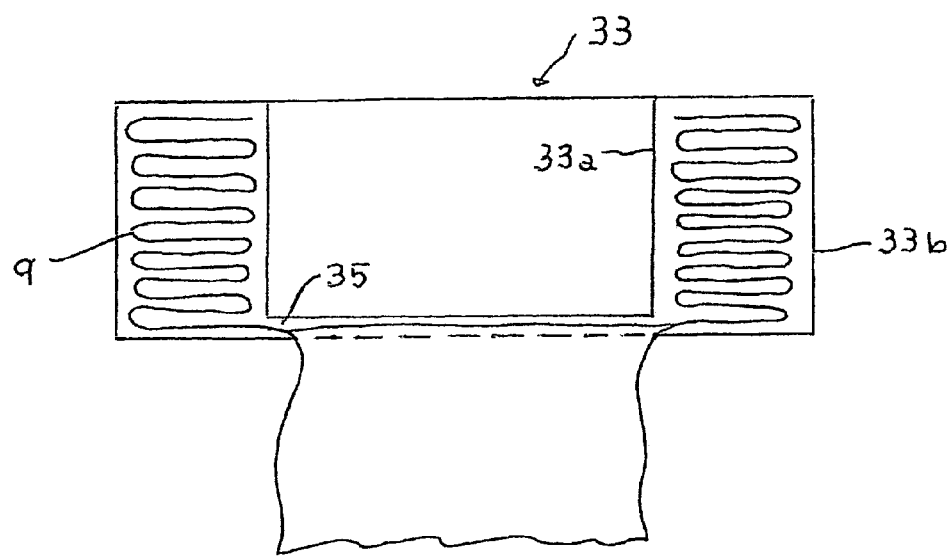
FIG. 5G is a cross sectional view of the cartridge enclosing the supply of endless bagging material shown in FIG. 5C taken along lines G.

FIG. 5G shows a cross-sectional view of the cartridge. 33 shown in FIG. 5C taken along the lines G. As shown in this view the cartridge inner side wall 33a includes the slot 35 through which the supply of bagging material 9 is dispensed to form a bag for use. When the supply of bagging material is pulled out to extend below the bottom wall of the cartridge, a bag clip 10 is applied to the lower end of the bagging material to form the lower bag seal.

As shown in FIG. 5E the cart assembly could be formed with a single upstanding member 28 attached to the lower portion 27. The lower portion may be pivotally mounted to the upstanding member 28 to form a foldable assembly if desired. The wheels 32 for the cart are attached to the lower portion 27. In this embodiment of the cart assembly there is a cartridge support element or surface 36 attached to the upstanding member 28 adjacent to the upper end thereof and having the planar surface extending parallel to the upstanding member 28 to provide a support for the cartridge. Further, there is a cartridge support member 30 attached to the upstanding member 28 below the cartridge supporting element or surface 36. An upper handle portion 29 is attached to the upper end of the single support member 28. The cartridge is firmly secured to the cart assembly by placing the cartridge on the cartridge support member 30 with the outer circumferential upstanding wall 33b pressed against the cartridge support element or surface 36 and mounting at least one clip member 34 that engages the inner annular wall 33a of the cartridge and the cartridge support element 36 between the ends thereof. It should be understood that this embodiment may also be formed with the single upstanding member having a spike portion 28c at the lower end thereof which would be driven into the ground to support the bagging assembly for use and the handle portion 29 could be eliminated. Further, as shown in FIG. 5F the cartridge support element 36 may be formed with a first member 37 extending parallel to the upstanding member 28 and a second member 38 spaced from and extending parallel to the cartridge support member 30. The cartridge support member 30, the cartridge support element first member 37 and the cartridge support element second member 38 are connected to form a c-shaped clamping section to receive a cartridge of the endless bagging material. Again, the cartridge is secured to the upstanding member 28 by placing the cartridge on the cartridge support member 30 with the outer circumferential upstanding wall 33b pressed against the first member 37 of the cartridge support element 36 and mounting at least one clip member 34 that engages the inner annular wall 33a of the cartridge and the cartridge support element 36 between the ends thereof to clamp the cartridge to the cart. The end of the clip member that engages the cartridge support element 36 may be designed to engage the first member 37 or be moveably attached to the second member 38. With the use of this c-shaped clamping section, any vertically extending member secured to the ground or work surface, such as a fence post, lamp post or even a tree, may serve as the upstanding member 28. Further, if the dimensions of the cartridge, the cartridge support member 30 and the first 37 and second 38 members of the cartridge support element 36 of the c-shaped clamping section are of sufficient extent the use of the clip member or members 34 may not be necessary because of the wedging action between the cartridge and the c-shaped clamping section. Even in this circumstance, the clip member or members may be used to provide for a more secure mounting of the cartridge.

In any of the FIG. 5A to F embodiments the cardboard cartridge holding the supply of endless bagging material may be replaced with a rigid tray of substantially the same design as the supply tray in the second and third embodiments. With the substitution, the tray becomes the supply cartridge for that embodiment of the invention. The tray 11a includes a substantially open top container having outer upstanding side walls 12a and an upstanding inner center wall 13a that forms an opening 14a in the tray bottom wall 15a. The outer upstanding side wall has either a continuous wall or a number of wall portions, even finger-like sections, that extends therefrom parallel to the bottom wall and towards the inner center wall to define a top wall for the tray. Between that top wall and the inner center wall there is an opening from which a supply of endless bagging material held in the tray is fed to form the bags for use and through which a supply of the endless bagging material is loaded into the tray. The area between the sidewalls 12a, the inner center wall 13a and the bottom wall is adapted to receive a supply of endless bagging material and the top wall aids to retain the supply of endless bagging material in the tray during use. When a tray as described is used in these FIGS. 5A to F embodiments, the tray is secured or held to the at least one upstanding member by a bolt and nut or other suitable fastener arrangement or the c-shaped clamping section described above. Further, in the FIG. 5A embodiment wherein there are at least two upstanding members, the bolts may also serve as the cartridge or tray support members that extend parallel to the working surface.

In either of the above-described cart embodiments of the invention, the cart may be designed to be foldable or collapsible to the maximum extent possible. This would include making the handle in the single upstanding member embodiment foldable against the upstanding member, in the same manner as the lower portion thereof. Further, in either cart embodiment, the upstanding members could be designed to be collapsible, such as telescopic portions, so as to be reduced in size to the same length dimension of the lower portion when collapsed against the one or more members. This provides a small and compact arrangement for storing the invention when not in use.

In use, the user mounts a cartridge of endless bagging material with the top or bottom wall thereof resting upon the cartridge support member 30 and facing downwardly towards the ground or work surface. The cartridge is then clamped to the cart or pole by mounting the clip members to engage the inner side wall of the cartridge and the handle portion of the cart or the cartridge support element 36, respectively. Alternatively the cartridge could be inserted into the c-shaped clamping section mounted on the vertical pole. The first bag is then formed with its bottom gathered material seal positioned to rest upon or just above the support member 31 of the cart or the ground or work surface supporting the pole. The waste or trash materials are then fed into the formed bag through the opening in the cartridge defined by the inner upstanding side wall thereof. When a supply cartridge comes to the indicator portion showing that the supply is about exhausted, the clip member or members are released, the empty cartridge is disposed of and a new cartridge is mounted unto the cart.

To form the first bag when using the device of the fourth embodiment, a user follows substantially the same process as described above for the other embodiments of the invention except that when the cardboard cartridge with the opening in the inner side wall is employed, the material is pulled downwardly from the cartridge and tied off to form the bottom of the first and each subsequent bag. To close each bag the user follows the same process set forth above for the other disclosed embodiments.

It is appreciated that many other suitable implementations can be used within the principles of the present invention generally shown above. The foregoing description of the exemplary embodiments of the invention has been presented for the purposes of illustration and description. It is not intended to be exhaustive or to limit the invention to the precise forms disclosed. Many modifications and variations are possible in light of the above teachings. It is intended that the scope of the invention be limited not with this detailed description, but rather only by the claims appended hereto.

We claim:

1. A waste bagging assembly comprising:
    at least one upstanding member supported to extend vertically from a substantially horizontal work surface
    a cartridge support member mounted on the at least one upstanding member and extending parallel to the horizontal work surface;
    a cartridge having an upstanding outer side wall, an upstanding inner side wall and top and bottom walls extending from the outer side wall towards the inner side wall to form an enclosure for a supply of endless bagging material, a supply of endless bagging material within the enclosure defined by the outer side, inner side, top and bottom walls of the cartridge, and the inner side wall defining an opening through the inner side wall of the cartridge adjacent one of the top and bottom walls thereof to permit the endless bagging material to be fed from the cartridge;
    a cartridge support element attached to the at least one upstanding member; and
    at least one mounting clip member whereby a cartridge having its bottom wall supported by the cartridge support member is firmly secured to the at least one upstanding member by positioning each mounting clip member to engage the upstanding inner side wall of the cartridge and a portion of the cartridge support element.

2. The waste bagging assembly of claim 1 further comprising bag clip members that are applied to the endless bagging material to form a bottom seal of a waste bag and to form a closure for a waste bag filled with debris.

3. The waste bagging assembly of claim 1 wherein the at least one upstanding member has a spike portion at the lower end thereof to support the bagging assembly on the work surface.

4. The waste bagging assembly of claim 1 wherein a portion of the cartridge support member that supports the bottom wall of the cartridge includes a friction enhancing material.

5. The waste bagging assembly of claim 1 further comprising a lower frame portion attached to the at least one upstanding member and extending perpendicular thereto and parallel to the horizontal work surface in the same direction as the cartridge support member and at least two wheel members mounted adjacent to the at least one upstanding member at the lower frame portion.

6. The waste bagging assembly of claim 5 wherein the assembly includes at least two upstanding members, each upstanding member including a cartridge support member and the cartridge support element comprises a handle portion extending between the at least two upstanding members.

7. The waste bagging assembly of claim 5 further comprising a support surface attached to the lower frame portion.

8. The waste bagging assembly of claim 5 wherein the lower frame portion is pivotally connected to the at least one upstanding member such that the lower frame portion can be folded against the at least one upstanding member for storage.

9. The waste bagging assembly of claim 3 wherein the cartridge support element attached to the upstanding member has a planar surface extending parallel to the upstanding member.

10. The waste bagging assembly of claim 9 wherein the support member attached to the at least one upstanding member further includes a second member spaced from and extending parallel to the cartridge support member and the cartridge support member, the cartridge support element planar surface and the second member are connected to form a c-shaped clamping section to receive the cartridge.

* * * * *